United States Patent
Kovacs

(10) Patent No.: US 6,415,220 B1
(45) Date of Patent: Jul. 2, 2002

(54) GEOLOCATION DETERMINATION

(75) Inventor: Ernô Kovacs, Stuttgart (DE)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/578,119

(22) Filed: May 24, 2000

(30) Foreign Application Priority Data

May 26, 1999 (EP) ............................................. 99110237

(51) Int. Cl.$^7$ .............................. H04K 1/00; H04K 3/00
(52) U.S. Cl. .................... 701/207; 370/443; 340/825.07
(58) Field of Search ......................... 701/207; 370/443, 370/348, 463, 356; 340/825.07; 709/200, 218, 223, 230

(56) References Cited

U.S. PATENT DOCUMENTS

| | | | | |
|---|---|---|---|---|
| 5,410,543 A | * | 4/1995 | Seitz et al. ............... | 370/85.13 |
| 5,850,388 A | * | 12/1998 | Anderson et al. ........... | 370/252 |
| 5,923,659 A | * | 7/1999 | Curry et al. ................ | 370/401 |
| 6,112,085 A | * | 8/2000 | Garner et al. ............... | 455/428 |
| 6,115,390 A | * | 9/2000 | Chuah ........................ | 370/443 |
| 6,115,580 A | * | 9/2000 | Chuprun et al. ................ | 455/1 |
| 6,115,615 A | * | 9/2000 | Ota et al. ................... | 455/553 |
| 6,167,255 A | * | 12/2000 | Kennedy, III et al. ...... | 455/414 |
| 6,167,513 A | * | 12/2000 | Inoue et al. ................ | 713/150 |
| 6,181,695 B1 | * | 1/2001 | Curry et al. ................ | 370/356 |

FOREIGN PATENT DOCUMENTS

WO    WO 98 58506     12/1998

OTHER PUBLICATIONS

Fujino N Et Al: "Mobile Information Service Based on Multi–Agent Architecture" IEICE Transactions on Communications, vol. E80–B, No. 10, Oct. 1, 1997, pp. 1401–1406, XP000734533.

* cited by examiner

Primary Examiner—Tan Nguyen
Assistant Examiner—Dalena Tran
(74) Attorney, Agent, or Firm—Frommer Lawrence & Haug LLP; William S. Frommer

(57) ABSTRACT

The invention relates to the field of mobile computing and more specific to the problem of determining the current position of a mobile device (1). If the mobile device (1) can attach itself to (wireless) networks (4) covering a small geographic area, the mobile device (1) can determine its position by querying stationary nodes attached to the network about their location. According to the invention a transmission of position information from a stationary node (3) to a mobile device (1) is effected above the transport layer (layer 4) of the OSI model such that the transmission is independent from the physical type of the networks (4) and/or the transmission (2) used.

18 Claims, 4 Drawing Sheets

Figure 5:
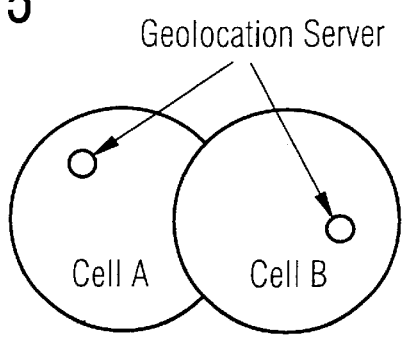

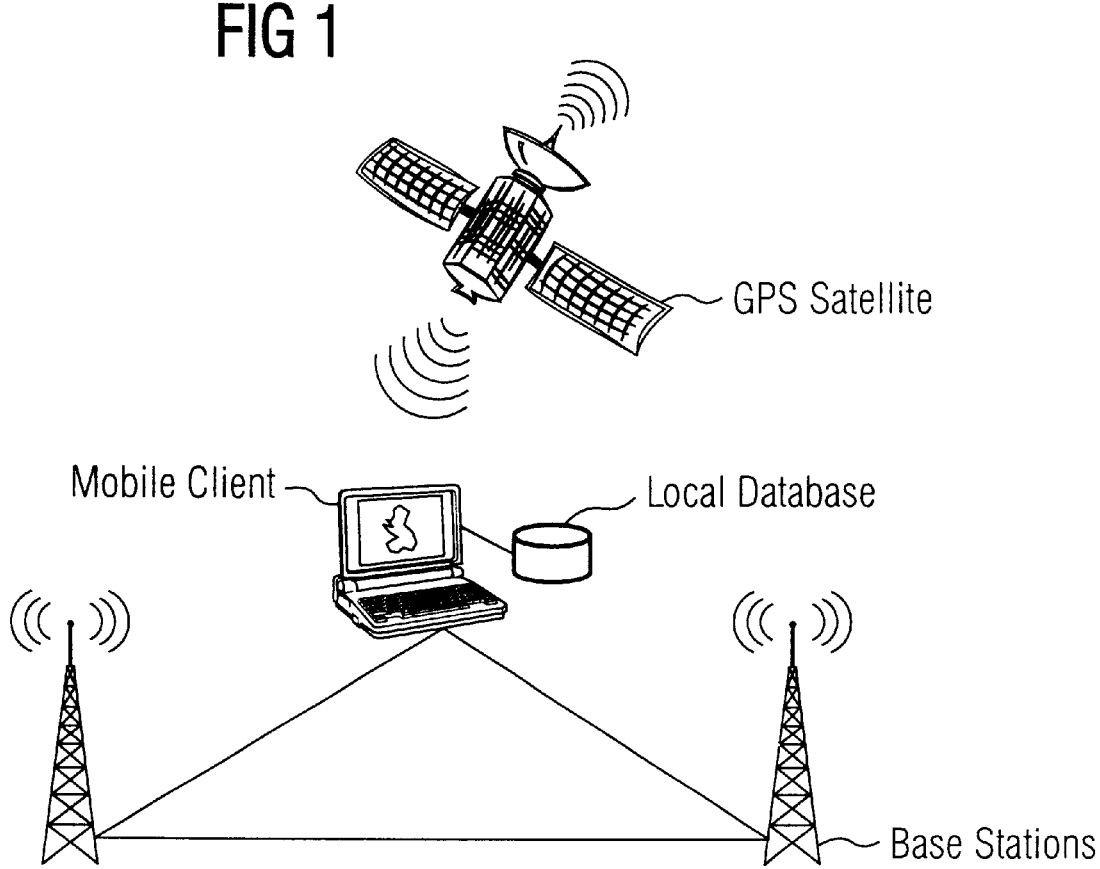
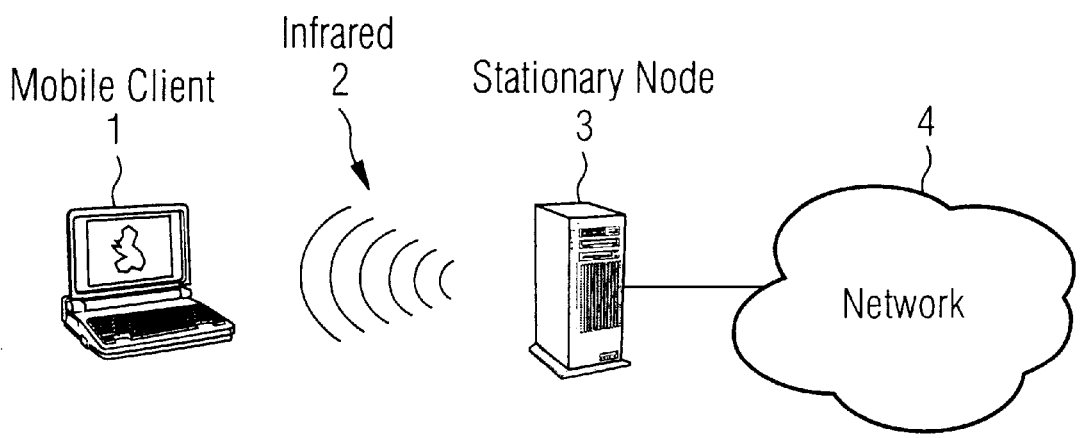

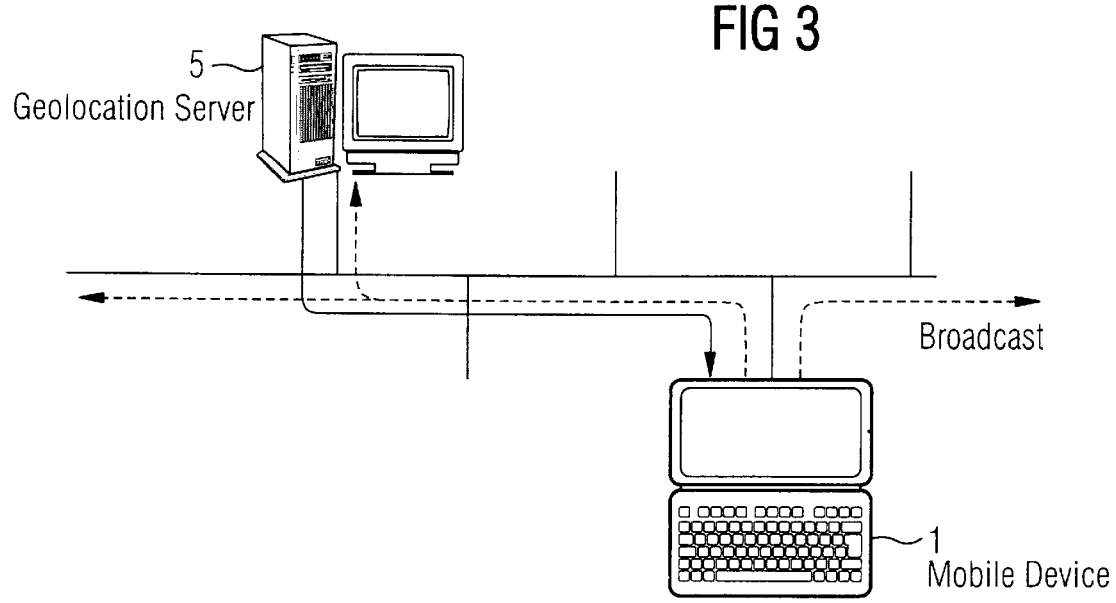
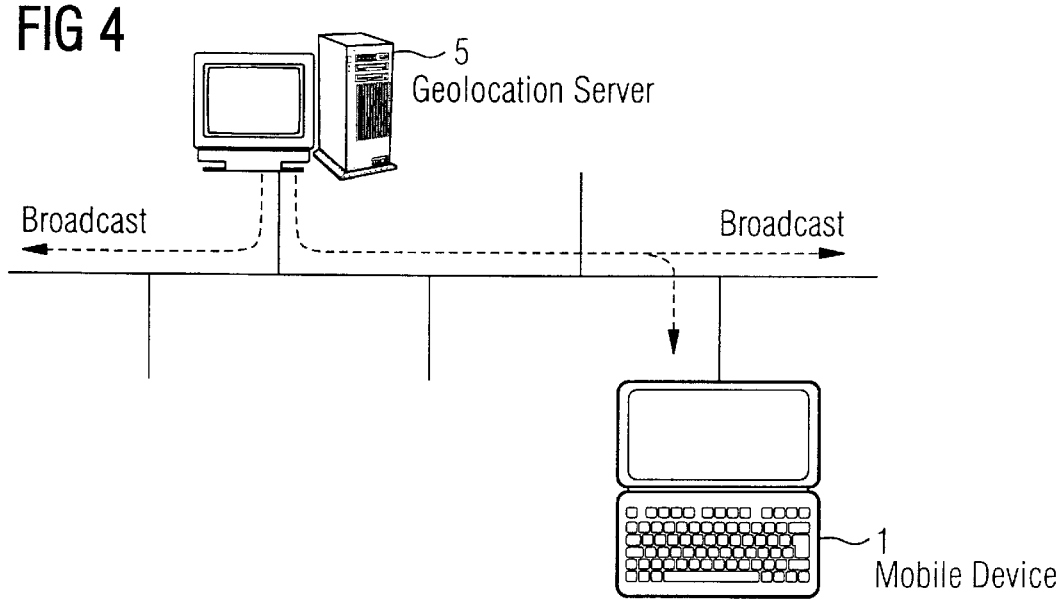

GEOLOCATION DETERMINATION

The present invention relates to a method for the determination of the current position of a mobile device, a program element loadable into a memory of a mobile device, a mobile communications device with current position determination capability as well as to a network providing a current position determination capability for attached mobile devices.

The invention generally relates to the field of mobile computing and more specific, to problem of determining the current position of a mobile device with communication ability.

The external state of the art in the field of position determination of mobile devices includes the following techniques:

The first technique is hardware support based, i.e. the mobile device has a special support for hardware devices. GPS (Global Positioning System) and D (Differential)-GPS receiver as well as measurement equipment for the speed and direction of the user, such as f.e. car navigation systems, are devices which fall into said category. FIG. 1 schematically shows a GPS Satellite connecting to a mobile client.

The next technique is network support based. In this case the network has means to determine the location of the mobile device. This can be done e.g. by using the base stations of the network or a triangulation method (see FIG. 1).

Another technique is based on a specific support on the mobile device. In this case the mobile device is equipped with a special module for determining the location e.g. a data base of streets and their location or a data base containing network identification and their current location.

GPS and some other known mentioned techniques are not useable indoors. On the one hand they can not be used indoors because they usually need a line of sight to the transmitter. On the other hand, the information that is provided by outdoor services is not very accurate. Indoor use requires much more precise location capability.

Today's GSM networks use the so-called GSM cell broadcast service to send location information to the mobile phones on a specific geographic area. This service can be offered by the network provider. Note that the position of the base station is transmitted. therefore not the position of the user, but only the cell he is located in is known. GSM cells, however, cover a huge range. The service relies on the network specific cell broadcast and is only useable within the GSM network as this solution works on layer 2 of the OSI model (see FIG. 7), i.e. the data link layer containing the specific GSM internal protocols.

Details of the cell broadcast short message service of the GSM service can be found in Redel et al, "GSM and personal communications handbook", 1998, Artec House, Inc.

From IEEE Personal Communications, October 1998, pages 8 to 24, a mobile access to web resources is known. The mobile device can be f.e. a laptop computer. Visualization of physical geography and object locations via a protocol for interactive floor maps is proposed. Local-area service discovery is based on embedding location information into a existing data network rather than using external information such as GPS coordinates. Outfitted subnets broadcast periodically a beacon packet to the local subnet addresses (and in some cases multicast with limited scope).

Departing from the above prior art it is therefore the object of the present invention to provide for a technique for the determination of the position of mobile devices which is platform independent.

This object is achieved by means of the features of the independent claims. The dependent claims develop further the central idea of the present invention.

According to the present invention therefore a method for the determination of the current position of a mobile device is provided. Stationary nodes of at least one network are provided with position information representing the stationary position of the corresponding node. The position information of at least one node of the at least one network is transmitted to a mobile device. The current position of the mobile device is determined on the basis of the at least one transmitted position information. The transmission of the position information is effected above the transport layer (layer 4) of the OSI model such that the transmission is independent from the physical type of the networks and/or the transmission.

Without triangulation or generally, without processing position information of a plurality of stationary nodes, the precision of the determination of the current position of the mobile device essentially corresponds to the range of the transmission used which can be as small as f.e. 0.6 m in case of an Infrared transmission.

The transmission on the physical layer can be particularly effected such that is adapted for indoor use or generally for non-line-of-sight (NLOS) communication.

A broadcast mode can be provided in which the corresponding stationary nodes of the network send periodically their position information to mobile devices.

Alternatively or additionally, a request/reply mode can be provided in which the corresponding stationary nodes of the network send their position information to mobile devices only on request.

A conflict resolution function can be provided to detect the appropriate current position of the mobile device in case a plurality of different position information of different nodes have been transmitted to the mobile device.

The conflict resolution can be effected in the network or in the mobile device.

The position information furthermore can contain additional information about technical and/or geographical features of the network, such as e.g. the geographic extension of the corresponding network, room information and/or site information.

A geolocation server in the network can be provided being connected to a data base comprising the positional information of at least one stationary node of the corresponding network.

The position information can be broadcast or transmitted in a request-reply mode of communication.

According to another aspect of the present invention a program element comprising program code means loadable into a memory of a mobile device is provided. The program element is a application protocol above layer four of the OSI model, for receiving position information of at least one node of a network, and determining the current position of the mobile device on the basis of the transmitted position information.

According to the present invention furthermore a mobile communications device with current position determination ability is provided. The device can comprise a communication controller designed to receive positional information from at least one stationary transmitting node of at least one network. The communication controller can be adapted to receive the positional information, which transmission is effected by means of an application protocol, i.e. a protocol above the transport layer (layer 4) of the OSI model such that the transmission is independent from the physical type of the networks and/or the transmission.

The mobile communications device can comprise a storage unit for storing positional information received.

According to another aspect of the present invention a network providing for a current position determination ability for mobile devices is provided. The network comprises at least one stationary node adapted to transmit position information representing the stationary position of the corresponding node. At least one stationary node is adapted to transmit the position information above the transport layer (layer 4) of the OSI model such that the transmission is independent from the physical type of the network and/or the transmission.

The at least one stationary node of the network can be adapted for a broadcast mode in which the corresponding positional information is broadcast periodically. Alternatively or additionally the at least one stationary node can be adapted for a request/reply position information transmission mode.

The network can comprise a geolocation server being connected to a data base comprising the positional information of at least one stationary node of the network.

Further advantages, features and objects of the present invention will come clearer from the following detailed explanation of embodiments and with reference to the figures of the enclosed drawings.

Figure 6:
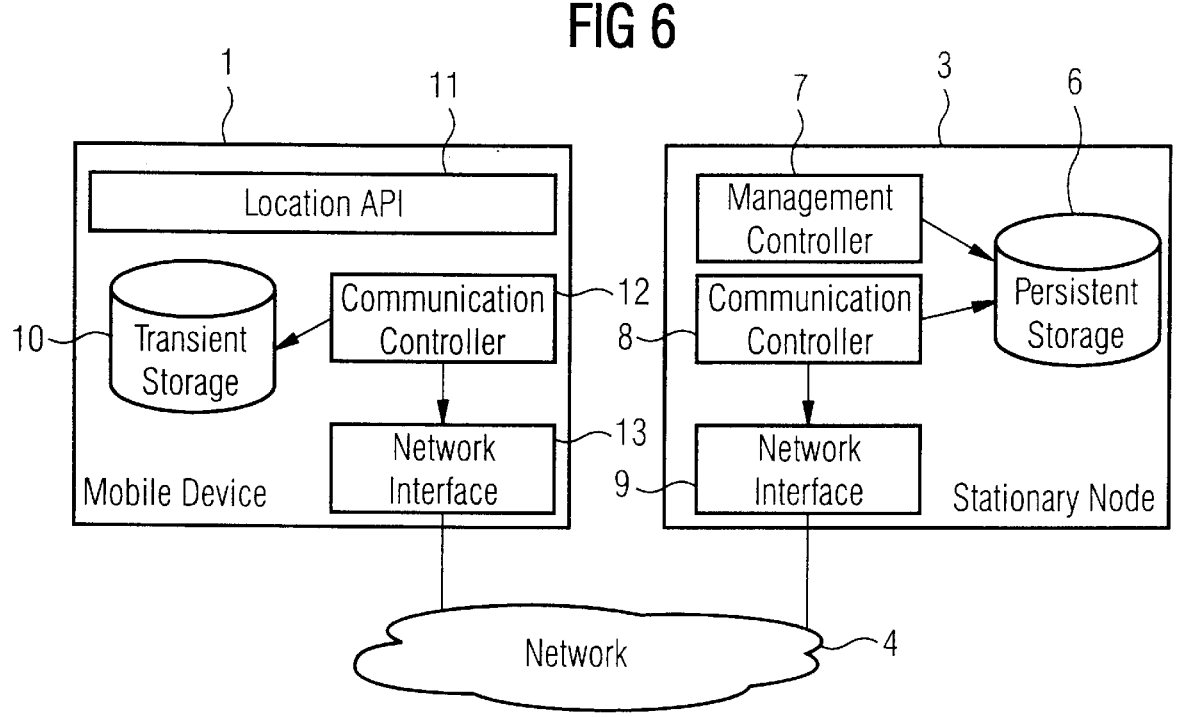
Figure 7:
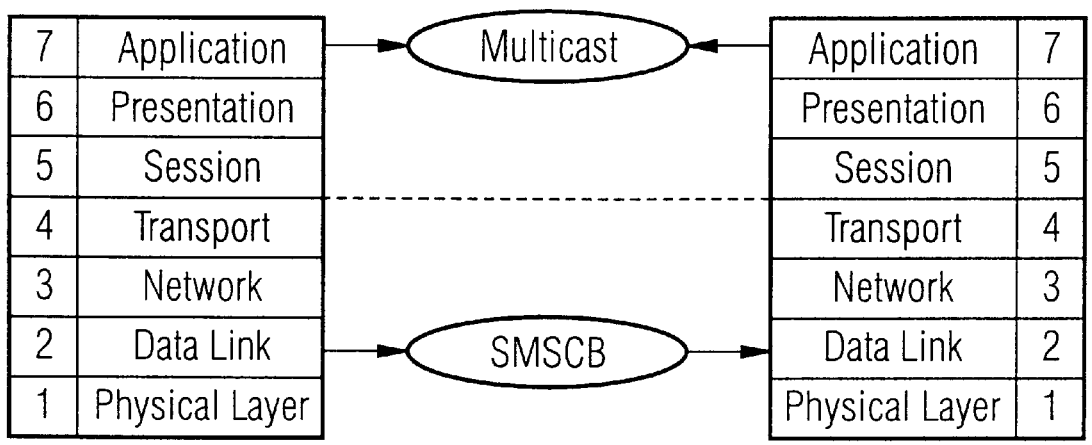

FIG. 1 shows position determination techniques from mobile devices according to the prior art, FIG. 2 shows an example for the use of an infrared transmission to broadcast location position according to the present invention, FIG. 3 shows an example for the use of an IP (Internet Protocol) broadcast from a mobile device according to the present invention, FIG. 4 shows an example for using an IP (Internet Protocol) broadcast service from a geolocation server according to the present invention, FIG. 5 shows cells with a physical hand-over function, FIG. 6 shows the architecture of a stationary node and a mobile device according to the present invention, and FIG. 7 shows a comparison of the technique according to the present invention and a known GSM position determination solution using the ISO/OSI protocol layer representation.

With reference to FIG. 2 a first embodiment of the present invention will now be explained. A mobile device 1 can connect itself to (wireless) networks covering a small geographic area by means of an infrared transmission 2. The mobile device 1 can determine its current position by receiving positional information from stationary nodes 3 attached to the network 4. The mobile device 1 can for example query stationary nodes 3 about their location.

As the present invention is particularly adapted for indoor use, it is preferred that the mobile device 1 connects itself to local networks 4 with a limited geographic extension by means of an infrared (0.6 meter), wave LAN (100 meter to 400 meter), Ethernet (500 meter to 1500 meter) or Bluetooth (2.4 GHz, 10 m) network. If the position extension of the network 4 is known, the mobile device 1 can determine its position with a certain limited range. If additional information can be extracted from the network 4 (e.g. on which stationary nodes 3 of the network 4 the mobile device 1 is connected), additional data bases can be searched for the position information.

In contrast to the prior art the program element according to the present invention can be applied to any kind of transmission and/or network 4, i.e. it is platform independent. Note that the network can for example be an IP (Internet Protocol) network. According to the present invention the transmission of the position information is effected on top of the TCP/IP or UDP/IP protocol stack (above layer 4 of the OSI model), while the known GSM solution works on layer 2 (the GSM internal protocols). With other words, the transmission of the position information according to the present invention is effected by means of a application protocol and therefore in the layer of E-Mail, WWW, TELNET, FTP, DNS and other applications of the TCP/IP protocol stack.

In contrast to the known GSM solution according to the present invention additional information can be attached to the transmitted position information, such that the transmitted information contains much more information than the information cell broadcast by GSM networks. Said additional information can for example be the geographic extension of the network, room information and/or site information. Details of said attached information can be found in table 1 further below.

The known GSM solution is based on a periodic broadcast, whereas according to the present invention a plurality of modes, such as for example a broadcast mode and a reply/response mode are provided.

As will now be explained with reference to FIGS. 3 and 4 a communication means (special node) having the internal structure as shown in FIG. 6 (reference 5) is added either to a network infrastructure component (router, switches, etc.) or to one of the stationary attached devices in the network 4. This special node is called geolocation server 5 of the network 4.

The internal structure of the geolocation server 5 of the network 4 is shown in FIG. 6. A permanent (persistent) storing unit 6 contains the location of the corresponding stationary device and is called location store. A communication controller 8 is provided for answering queries or for broadcasting the information of the storing unit 6 on the network 4. A management controller 7 is provided for managing the communication means, e.g. setting the broadcast interval, changing the content of the storing unit 6, etc. The communication controller 8 is connected to the network 4 by means of a network interface 9.

The internal structure of a mobile device according to the present invention is shown in FIG. 6. A communication controller 12 is provided to send queries to the network 4 or to receive broadcast position information from the network 4. A transient storing unit 10 is provided for storing position information received. A so-called location API 11 is provided for accessing the position information from the operating system or applications of the mobile device 1. The communication controller 12 is connected to the network 4 by means of a network interface 13.

Using the devices as shown in FIG. 6, the mobile device 1 can access position information stored on the stationary node in the network 4. This can be effected in the following two modes:

1. Broadcast mode
   In the broadcast mode, the communication component in the network 4 uses the network broadcast facilities to periodically broadcast the current position information to the attached (mobile) devices. A mobile node just has to listen to incoming broadcast information packets. This can be of advantage, as the mobile device 1 can save power as it does not have to transmit query signals. The broadcast mode is shown in FIG. 4. In the shown example the server 5 broadcasts its position information on the network 4. The mobile device 1 receives the information in a passive mode.

2. Request/reply mode

In this mode, the mobile device 1 requests the position information by sending its request on the network (for example by broadcasting) and waits for a reply from the nodes in the network 4. FIG. 3 shows such a request/reply mode. As shown in the example of FIG. 3, the mobile device 1 requests the position information by sending a broadcast information to the network 4 and by receiving the co-ordinates correspondingly directly.

In addition to the above described modes, the geolocation server might send the geolocation information directly (not using broadcast) to the mobile device if it is able to determine the active (mobile) devices within its cell. This is especially useful if the network does not provide a broadcast service.

The information used to describe the location of the network can have different structure and encoding. The following table 1 gives an example of how this information can be structured using Key/Value pairs. Other structures are possible:

TABLE 1

| Attribute | Meaning |
| --- | --- |
| Network.Sender | Location (position) of the transmitting stationary node. |
| Network.Extension | Geographic extension of the network (range of the transmission, e.g. 0.6 meter for Infrared). |
| Network.Name | Logical Name of the network. |
| Network.Room | Name of the room where the network is located. |
| Network.Building | Name of the building where the network is located. |
| Network.Locationname | Name of the location where the network is located. |
| Network.CellId | The CellId (cell identification) where the sending/stationary node is located. Can be used if the physical network provide transparent hand-over between different physical cells. |
| Network.Shape | The shape of the network with addition information, e.g. where the corners are located. E.g. a rectangle can be defined by declaring its four corners, a circle through its middle point and its extension, etc. |

The given values are just examples. Not all of them must be present. Also addition information might be send.

Some wireless networks provide as shown in FIG. 5 cell hand-over on the physical level without changing the network on the network layer (layer 3). To have a more accurate indication of the geolocation, a Geolocation Server can be placed into each of the different physical cells. In this case, the information send to the mobile device will include the CellId of the physical network. By comparing this information with the current CellId of the physical network enables the mobile device to determine the current valid geolocation.

In both operational modes, the mobile device might receive answers from different machines. This might happen, if more than one machine in the network is configured to send the required information. The client must then perform a conflict resolution to find an appropriate location. Some forms of conflict resolution are:

Building an intersection of the two received locations,

Select one, e.g. the first incoming position information,

Request the transmitting nodes to solve the problem between them such that the conflict is solve on the network side, Checking the CellId

What is claimed is:

1. Method for the determination of the current position of a mobile device, the method comprising the following steps:

providing a plurality of stationary nodes in at least one network, providing each of said plurality of stationary nodes with position information representing the stationary position of the respective corresponding node, transmitting the respective position information from at least one stationary node of the at least one network to a mobile device, and determining the current position of the mobile device on the basis of the at least one transmitted position information, wherein the transmission of the position information is effected in an OSI protocol layer higher than a transport layer of the OSI protocol such that the transmission is independent from the physical type of the networks and/or the transmission.

2. Method according to claim 1, characterized in that the transmission (2) is effected on the physical layer such that it is adapted for non-line-of-sight communication.

3. Method according to claim 1, characterized in that a broadcast mode is provided in which the corresponding stationary nodes (3) of the network (4) send periodically their position information to mobile devices (1).

4. Method according to claim 1, characterized in that a request/reply mode is provided in which the corresponding stationary nodes (3) of the network (4) send their position information to mobile devices (1) on request.

5. Method according to claim 1, characterized in that a conflict resolution function is provided to detect the appropriate current position of the mobile device (1) in case a plurality of different position information of different nodes (3) have been sent to the mobile device (1).

6. Method according to claim 5, characterized in that the conflict resolution is effected in the network (4).

7. Method according to claim 5, characterized in that the conflict resolution is effected in the mobile device (1).

8. Method according to claim 1, characterized in that the positional information furthermore contains additional information about technical and/or geographical features of the network.

9. Method according to claim 1, characterized by providing a geolocation server (5) in the network (4), the geolocation server being connected to a database (6) comprising the positional information of at least one stationary node (3) of the corresponding network (4).

10. Method according to claim 1, characterized in that the position information is broadcast.

11. Method according to claim 1, characterized in that the position information is transmitted in a point-to-point communication.

12. A program element comprising a program code loadable into a memory of a mobile device, wherein the program element operates in an OSI protocol layer higher than a transport layer of the OSI protocol, such that, the program element is independent from the physical type of the networks and/or the transmission, for receiving position information from at least one of a plurality of stationary nodes of at least one network, in which the position information of a respective node represents a stationary position of the respective node, and determining the current position of the mobile device on the basis of the received position information.

13. Mobile communications device with current position determination capability, the device comprising:

a communication controller designed to receive positional information from at least one of a plurality of stationary nodes of at least one network, in which the positional information of a respective node represents the stationary position of the respective node;

wherein the communication controller is adapted to receive the positional information which transmission is effected in an OSI protocol layer higher than a transport layer of the OSI protocol such that the transmission is independent from the physical type of the networks and/or the transmission.

14. Mobile communications device according to claim 13, characterized in that it comprises a storage unit (10) for storing positional information received.

15. Network with a current position determination capability for mobile devices, comprising a plurality of stationary nodes in said network, whereby at least one stationary node is adapted to transmit position information representing the stationary position thereof, wherein the at least one stationary node is adapted to transmit the position information in an OSI protocol layer higher than a transport layer of the OSI protocol of the mobile device such that the transmission is independent from the physical type of the network and/or the transmission.

16. Network according to claim 15, characterized in that the at least one stationary node (3) is adapted for a broadcast mode in which the corresponding positional information is broadcast periodically.

17. Network according to claim 16, characterized in that the at least one stationary node (3) is adapted for a request/reply position information transmission mode.

18. Network according to anyone of claim 16, characterized in that it comprises a geolocation server (5), the geolocation server (5) being connected to a database (6) comprising the positional information of at least one stationary node of the network (4).

* * * * *